(12) United States Patent
Stumpf

(10) Patent No.: US 11,840,444 B2
(45) Date of Patent: Dec. 12, 2023

(54) FUEL STORAGE AND DISPENSING DEVICE

(71) Applicant: Fuelie Systems, Inc., Lewes, DE (US)

(72) Inventor: Thomas R. Stumpf, Chapel Hill, NC (US)

(73) Assignee: FUELIE SYSTEMS, INC., Lewes, DE (US)

( * ) Notice: Subject to any disclaimer, the term of this patent is extended or adjusted under 35 U.S.C. 154(b) by 463 days.

(21) Appl. No.: 16/980,985

(22) PCT Filed: Mar. 14, 2019

(86) PCT No.: PCT/US2019/022189
§ 371 (c)(1),
(2) Date: Sep. 15, 2020

(87) PCT Pub. No.: WO2019/178315
PCT Pub. Date: Sep. 19, 2019

(65) Prior Publication Data
US 2021/0362998 A1 Nov. 25, 2021

Related U.S. Application Data

(60) Provisional application No. 62/644,013, filed on Mar. 16, 2018.

(51) Int. Cl.
*B67D 7/84* (2010.01)
*B67D 7/34* (2010.01)
(Continued)

(52) U.S. Cl.
CPC ............. *B67D 7/84* (2013.01); *B67D 7/04* (2013.01); *B67D 7/34* (2013.01); *B67D 7/40* (2013.01); *B67D 7/62* (2013.01); *B67D 7/78* (2013.01)

(58) Field of Classification Search
CPC ... B67D 7/84; B67D 7/04; B67D 7/34; B67D 7/62; B67D 7/78
See application file for complete search history.

(56) References Cited

U.S. PATENT DOCUMENTS 2,150,025 A 3/1939 Cook, Jr. et al.
2,421,765 A 6/1947 Taylor
(Continued)

FOREIGN PATENT DOCUMENTS

BE 554752 A 1/1960
CN 201380749 Y 1/2010
(Continued)

OTHER PUBLICATIONS

Headquarters, Department of the Army. "Chapter 2. Section II—Refueling Equipment. Advanced Aviation Forward Area Refueling System." 4 pages. Army Techniques Publication for Forward Arming and Refueling Points. ATP 3-04.94. Jan. 2012. Accessed online at http://armypubs.army.mil/doctrine/dr_pubs/dr_a/pdf/atp3_04x94.pdf.

(Continued)

*Primary Examiner* — Jason K Niesz
(74) *Attorney, Agent, or Firm* — COATS & BENNETT, PLLC

(57) ABSTRACT

A fuel storage and dispensing device that includes one or more storage tanks that are housed in a cabinet. A dispenser is fluidly attached to one or more of the storage tanks through a conduit. The dispenser includes one or more safety features to prevent inadvertent dispensing of fuel and to control the dispensing of the fuel.

16 Claims, 14 Drawing Sheets

(51) Int. Cl.
   *B67D 7/04*    (2010.01)
   *B67D 7/40*    (2010.01)
   *B67D 7/62*    (2010.01)
   *B67D 7/78*    (2010.01)

(56) References Cited

U.S. PATENT DOCUMENTS

| | | |
|---|---|---|
| 2,518,569 A | 8/1950 | Pierson |
| 2,667,397 A | 1/1954 | Hallisey |
| 2,674,361 A | 4/1954 | Moore |
| 2,853,259 A | 9/1958 | Underwood, Jr. |
| 2,965,196 A | 12/1960 | Rich, Jr. |
| 2,969,803 A | 1/1961 | Mosher |
| 3,050,278 A | 8/1962 | Gardner et al. |
| 3,797,744 A | 3/1974 | Smith |
| 3,827,455 A | 8/1974 | Lee |
| 3,976,227 A | 8/1976 | Ray |
| 3,977,602 A | 8/1976 | Kirch |
| 4,481,972 A | 11/1984 | Stavlo |
| 4,542,774 A | 9/1985 | Stavlo |
| 4,564,109 A | 1/1986 | Stavlo |
| 4,625,627 A | 12/1986 | Livanos et al. |
| 4,860,972 A | 8/1989 | Lannerd et al. |
| 4,932,609 A | 6/1990 | Secchiaroli et al. |
| 4,967,934 A | 11/1990 | Andonian |
| 5,064,123 A | 11/1991 | Aiello et al. |
| 5,154,314 A | 10/1992 | Van Wormer |
| 5,176,265 A | 1/1993 | Bennett |
| 5,242,032 A | 9/1993 | Prestwood et al. |
| 5,249,612 A | 10/1993 | Parks et al. |
| 5,307,839 A | 5/1994 | Loebker et al. |
| 5,360,034 A | 11/1994 | Der Manuelian |
| 5,396,885 A | 3/1995 | Nelson |
| 5,431,422 A | 7/1995 | Gamache |
| 5,570,895 A | 11/1996 | McCue et al. |
| 5,868,179 A * | 2/1999 | Hartsell, Jr. ............ B67D 7/04 141/94 |
| 5,893,398 A | 4/1999 | Garrett, Jr. |
| 6,059,127 A | 5/2000 | Bennett |
| 6,196,255 B1 | 3/2001 | Poillucci |
| 6,334,622 B1 | 1/2002 | Romero |
| 6,431,088 B2 | 8/2002 | Mahnken |
| 6,446,881 B1 | 9/2002 | You |
| 6,701,980 B2 | 3/2004 | Rothrock |
| 6,715,195 B2 | 4/2004 | Erickson |
| 6,722,186 B2 | 4/2004 | Biess |
| 6,792,966 B2 | 9/2004 | Harvey |
| 6,860,300 B1 | 3/2005 | Kuntz |
| 6,983,704 B1 | 1/2006 | Ness |
| 7,017,741 B1 | 3/2006 | Williamson |
| 7,070,096 B2 | 7/2006 | Müller et al. |
| 7,111,636 B2 | 9/2006 | Hutchinson et al. |
| 7,114,732 B1 | 10/2006 | Ismail |
| 7,122,147 B2 | 10/2006 | Wakeman et al. |
| 7,252,297 B1 | 8/2007 | Barritt et al. |
| 7,300,073 B2 | 11/2007 | Bachman |
| 7,353,947 B2 | 4/2008 | Weissbrod |
| 7,438,745 B2 | 10/2008 | Deane et al. |
| 7,484,521 B2 | 2/2009 | Kimbara et al. |
| 8,016,300 B2 | 9/2011 | Cramer et al. |
| 8,146,761 B2 | 4/2012 | Fawley |
| 8,196,963 B2 | 6/2012 | Bachman |
| 8,403,071 B1 | 3/2013 | Webb |
| 8,474,491 B2 * | 7/2013 | Lachman ............ G07F 17/06 141/105 |
| 8,579,332 B2 | 11/2013 | Sonderegger et al. |
| 8,740,251 B2 | 6/2014 | Batson et al. |
| 8,919,476 B2 | 12/2014 | Holland et al. |
| 9,193,471 B2 | 11/2015 | Fernandez Garcia et al. |
| 9,237,928 B2 | 1/2016 | De Nando et al. |
| 9,988,259 B2 | 6/2018 | Stumpf |
| 10,029,907 B2 | 7/2018 | Stumpf |
| 10,336,601 B2 | 7/2019 | Wiebe |
| 2002/0079016 A1 | 6/2002 | Webb |
| 2002/0084277 A1 | 7/2002 | Mullens et al. |
| 2002/0109322 A1 | 8/2002 | Bock |
| 2003/0052466 A1 | 3/2003 | Intravatola |
| 2003/0056824 A1 | 3/2003 | Harvey |
| 2003/0085796 A1 | 5/2003 | Smith |
| 2005/0184084 A1 | 8/2005 | Wells |
| 2005/0236044 A1 | 10/2005 | Hutchinson et al. |
| 2008/0112783 A1 | 5/2008 | Bock |
| 2009/0048711 A1 | 2/2009 | DeLine |
| 2009/0272666 A1 | 11/2009 | Marcel |
| 2011/0089190 A1 | 4/2011 | Gehman |
| 2011/0168724 A1 | 7/2011 | Bruinius |
| 2011/0232376 A1 | 9/2011 | Dodd et al. |
| 2011/0240800 A1 | 10/2011 | Fox, Jr. |
| 2012/0024892 A1 | 2/2012 | Bartlett et al. |
| 2012/0025027 A1 | 2/2012 | Yandle et al. |
| 2012/0138554 A1 | 6/2012 | Ness |
| 2012/0199224 A1 | 8/2012 | Fagerhof |
| 2012/0241041 A1 | 9/2012 | Myers |
| 2014/0163725 A1 * | 6/2014 | Wilinski ............ B67D 7/34 700/237 |
| 2014/0263729 A1 | 9/2014 | Stewart |
| 2015/0308620 A1 | 10/2015 | Frenal et al. |
| 2016/0017823 A1 | 1/2016 | Sloan et al. |
| 2016/0362289 A1 | 12/2016 | Wiebe |
| 2017/0144772 A1 | 5/2017 | Stumpf |
| 2017/0144880 A1 | 5/2017 | Stumpf |
| 2017/0365120 A1 | 12/2017 | Fieglein et al. |

FOREIGN PATENT DOCUMENTS

| | | |
|---|---|---|
| DE | 202007012316 U1 | 12/2007 |
| EP | 1127787 A2 | 8/2001 |
| EP | 2682667 A2 | 1/2014 |
| FR | 2587019 A1 | 3/1987 |
| JP | 2005054949 A | 3/2005 |
| WO | 2008105721 A1 | 9/2008 |
| WO | 2013093544 A1 | 6/2013 |

OTHER PUBLICATIONS

Mobile Fueling Station. Product information sheet. 1 page. Viewed online Jun. 10, 2013, at http://dynafab.com/tank-mobile-fule-tanks.html. Dynafab Corp., Tomball, TX.

500 Gallon Mobile Fuel System. Product information sheet. 1 page. Viewed online Jun. 10, 2013, at http://www.fueltrailers.net/id71.html. L&J Services, Fruitland Park, FL.

EZ Mobile Fuelers. Product information sheet. 2 pages. Viewed online Jun. 10, 2013, at http://www.ezfuel.com/products/ez_mobile_fueler/. EZ Fuel & Tank Solutions, Duluth, GA.

Fuel Transport Tanks & Gas Caddies. 1 page. Viewed online Jun. 10, 2013, at http://www.tank-depot.com/browse.aspx?id=4. The Tank Depot, Pompano Beach, FL.

TransCube Vehicle and Equipment Fuel Trailers. Product information sheet. 3 pages. Viewed online Jun. 10, 2013, at http://www.qualityfueltrailers.com/fuel-trailer-types/vehicle-and-equipment-fuel-trailers/transcube-fuel-trailers. Quality Fuel Trailer & Tank, Inc. Petaluma, CA.

* cited by examiner

FUEL STORAGE AND DISPENSING DEVICE

RELATED APPLICATIONS

This application claims the benefit of U.S. Provisional Application No. 62/644,013 filed Mar. 16, 2018, the disclosure of which is incorporated by reference herein in its entirety.

BACKGROUND

Fuel is needed to power equipment in almost every facet of daily life. Examples of equipment include but are not limited to cars, trucks, yard equipment (e.g., lawnmowers), industrial machinery, farm equipment, watercraft, and aircraft. Fuel is often obtained by the user at a service station. When relatively small amounts of fuel are needed, the user brings fuel containers, such as one gallon and five gallon cans, and fills them at the service station. The user than transports the filled containers to the equipment and transfers the fuel into the equipment. However, this can result in fuel being spilled due to the numerous transfers. Spills can occur when transferring the fuel into containers or equipment by accidently over-filling the container or equipment. Spills can also occur by having the nozzle positioned in the wrong location when transferring the fuel.

Obtaining fuel at the service station can also be inconvenient. Service stations can be a relatively long distance away from a user. Further, the user may need to obtain fuel at times when the service station is not open, or when it is difficult to get to the service station such as during bad weather. Further, service stations can be unsafe, particularly during the night.

SUMMARY

One aspect is directed to a fuel unit. The fuel unit includes a cabinet with a wall that extends around and forms an enclosed interior space, an opening in the wall to provide access to the interior space, a receptacle positioned within the interior space at the opening, a door mounted to the wall at the opening and movable between a closed position that extends across the opening and an open position away from the opening, and a lock movable between a locked position to secure the door in the closed position and prevent access to the interior space and an unlocked position. One or more fuel tanks are positioned within the interior space of the cabinet with each of the one or more fuel tanks configured to contain fuel. A conduit is connected to the one or more fuel tanks and has a distal end. The conduit is movable between a retracted position that is positioned within the interior space and an extended position that extends through the opening and with the distal end positioned outward beyond the interior space. A dispenser is mounted to the distal end of the conduit. The dispenser includes a handle sized to be grasped by a user and a nozzle that extends from the handle and includes and end through which the fuel is dispensed. The dispenser is sized to be mounted in the receptacle and within the interior space of the cabinet when the door is in the closed position. A pump moves the fuel from the one or more fuel tanks through the conduit and the dispenser. A control unit is positioned within the interior space to control the dispensing of fuel from the one or more fuel tanks. The control unit is configured to move the lock between the locked and unlocked positions, and activate the pump to move the fuel from the one or more fuel tanks and through the conduit and dispenser.

In another aspect, the control unit includes a communication circuit that receives a signal from the user, and a control processor that determines, based on the signal, that the user is authorized to dispense the fuel and moves the lock from the locked position to the unlocked position.

In another aspect, the dispenser includes a sensor in the handle and the control processor prevents the pump from being activated prior to receiving a signal from the sensor indicating that the user is holding the dispenser.

In another aspect, a first sensor is positioned in the handle of the dispenser to detect that the handle is being held by the user and a second sensor is positioned in the nozzle of the dispenser to detect that the nozzle is inserted into a fuel receptacle.

In another aspect, the receptacle includes a plate that extends across the opening in the wall of the cabinet and a mount positioned in front of the plate that secures the dispenser in the receptacle.

In another aspect, a rotatable holder having a rounded shape supports the conduit in the retracted position with the rotatable holder being spring biased towards the retracted position.

In another aspect, the pump is a variable speed pump to dispense the fuel from the one or more fuel tanks and through the conduit and dispenser at various speeds.

In another aspect, the door extends completely across the opening in the closed position to prevent access to the interior space, the conduit, and the dispenser.

In another aspect, a spring is connected to the door and configured to apply a force to the door to move the door to the open position when the lock moves from the locked position to the unlocked position.

In another aspect, a light illuminates the dispenser when the door is in the open position.

In another aspect, the pump is positioned within the interior space.

One aspect is directed to a fuel unit. The fuel unit includes a cabinet with a wall that extends around and forms an enclosed interior space, an opening that extends through the wall and into the interior space, a door mounted to the wall at the opening, and a lock positionable between a locked position to secure the door across the opening and an unlocked position. One or more fuel tanks are positioned within the interior space and configured to contain fuel. A conduit is connected to the one or more fuel tanks with the conduit including a distal end opposite the one or more fuel tanks. A dispenser is mounted to the distal end of the conduit. A pump moves the fuel from the one or more fuel tanks through the conduit and the dispenser. A control unit is positioned within the interior space to control dispensing of fuel from the one or more fuel tanks. The control unit is configured to receive a request for the fuel from a user, determine that the user is authorized to dispense the fuel, move the lock to the unlocked position to provide access to the dispenser that is positioned in the interior space, receive first and second signals that the dispenser is ready to dispense the fuel, and activate the pump and dispense the fuel through the dispenser after receiving the first and second signals.

In another aspect, the conduit and the dispenser are positioned within the interior space and behind the door when the door is in a closed position and the lock is in the locked position.

In another aspect, a plate extends across the opening in the wall of the cabinet, and a mount is positioned in front of the plate and secures the dispenser in the receptacle when the door is in a closed position and the lock is in the locked position.

In another aspect, a first sensor is positioned in the dispenser to detect that the handle is being held by the user and to send the first signal and a second sensor to detect that the nozzle is inserted into a fuel receptacle and to send the second signal.

One aspect is directed to a method of dispensing fuel from a fuel unit. The method includes: receiving a request for fuel from a user at the fuel unit while the fuel unit is in a closed position that includes a dispenser positioned within an interior of a cabinet and locked to the cabinet; determining from the request that the user is authorized to dispense the fuel; unlocking the dispenser after determining that the user is authorized to dispense the fuel; receiving a first signal that the dispenser is being held by the user; receiving a second signal that a nozzle of the dispenser is positioned for dispensing the fuel; and after receiving the first signal and the second signal, activating a pump and dispensing fuel through the dispenser.

In another aspect, determining from the request that the user is authorized to dispense the fuel includes sending the request to a remote server and receiving an indication from the remote server that the user is authorized to dispense the fuel.

In another aspect, the method includes receiving the first signal from a first sensor positioned in a handle of the dispenser that the handle is being held by the user and receiving the second signal, and receiving the second signal from a second sensor positioned in a nozzle of the dispenser that the nozzle is positioned in proximity to a metallic object.

In another aspect, the method includes receiving the first signal from a sensor in the dispenser and the second signal from a user device.

In another aspect, the method includes unlocking the dispenser by unlocking a door that extends over the dispenser when the dispenser is locked to the cabinet.

DETAILED DESCRIPTION

The present application is directed to a fuel storage and dispensing device referred to as a fuel unit. The device includes one or more storage tanks that are housed in a cabinet. A dispenser is fluidly attached to one or more of the storage tanks through a conduit. The dispenser includes one or more safety features to prevent inadvertent dispensing of fuel and to control the dispensing of the fuel.

Figure 1:
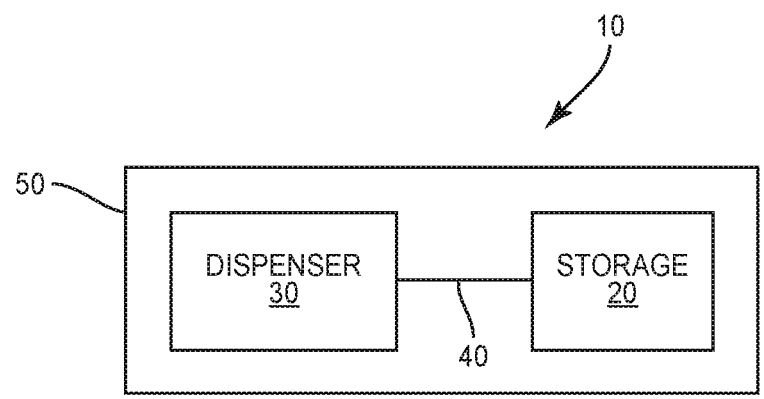
FIG. 1 is a schematic diagram of a fuel unit.

FIG. 1 schematically illustrates the fuel unit 10 that includes a storage unit 20 and a dispenser 30. A conduit 40 fluidly connects the storage unit 20 to the dispenser 30. The storage unit 20 is configured to contain various amounts of fuel, with one specific embodiment including a storage capacity of sixty (60) gallons. The storage unit 20 can include a single tank 21, or two or more tanks 21. The dispenser 30 receives the fuel from the storage unit 20 through a conduit 40. The dispenser 30 can include multiple safety features to ensure that the fuel is dispensed to an authorized user in a safe manner. A cabinet 50 can extend around the storage unit 20, dispenser 30, and conduit 40. The conduit 40 and dispenser 30 can be extended from the cabinet 50 to dispense the fuel to a fuel receptacle of the user.

Figure 2:
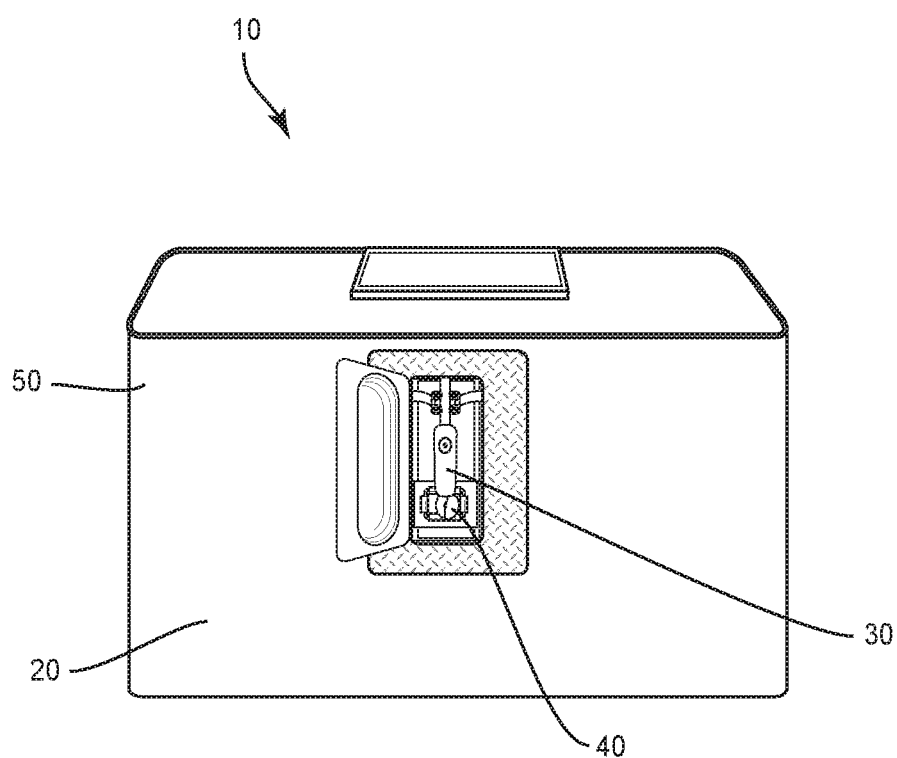
FIG. 2 is a front perspective view of a fuel unit in an open position.

FIG. 2 illustrates a fuel unit 10 in an open position. The storage unit 20, conduit (not illustrated) and dispenser 30 are positioned within the cabinet 50. In the open position, the dispenser 30 is accessible to the user so it can be grasped and moved away from the storage unit 20 to deliver the fuel as necessary within the proximity of the fuel unit 10.

Figure 3:
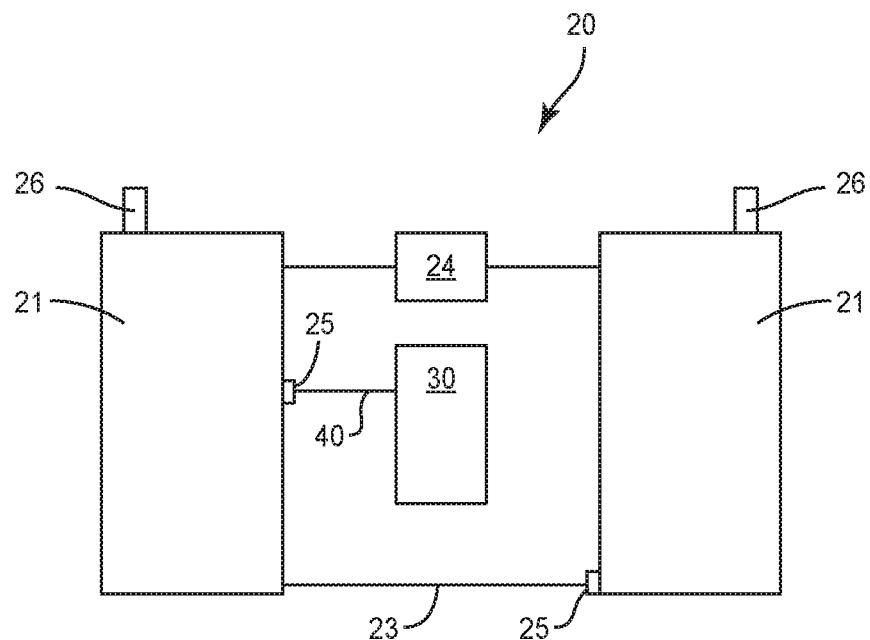
FIG. 3 is a schematic diagram of a pair of tanks.

FIG. 3 schematically illustrates the storage unit 20 that contains the fuel prior to being moved to the conduit 40. The storage unit 20 includes one or more storage tanks 21. The tanks 21 are sized to hold various amounts of fuel. In one embodiment, the storage unit 20 includes two tanks 21 each sized to hold thirty (30) gallons of fuel. The storage units 20 can include different numbers and sizes of tanks 21, including a single tank 21 and three or more tanks 21. FIG. 3 includes two tanks 21 that are the same size, although other embodiments can include tanks 21 of different sizes and/or shapes.

The tanks 21 can be fluidly connected through one or more conduits 23. The conduits 23 provide for moving fuel from one tank 21 to another tank 21. The one or more conduits 23 can be configured for the fuel to move in one direction (e.g., from a first tank 21 to a second tank 21), or can be configured for fuel to move in both directions (e.g., first tank 21 to second tank 21 and second tank 21 to first tank 21). One or both tanks 21 includes an outlet port 25 through which the fuel is moved to either another tank 21 or the conduit 40. One or more of the tanks 21 can include an inlet port 26 to receive fuel. The inlet port 26 can be used for filling the tanks 21 with fuel from an outside source.

In one design as illustrated in FIG. 3, one of the tanks 21 is a master tank that receives fuel from the one or more other tanks 21. The fuel from the master tank 21 is moved through the outlet port 25 for dispensing the fuel through the dispenser 30.

Figure 4:
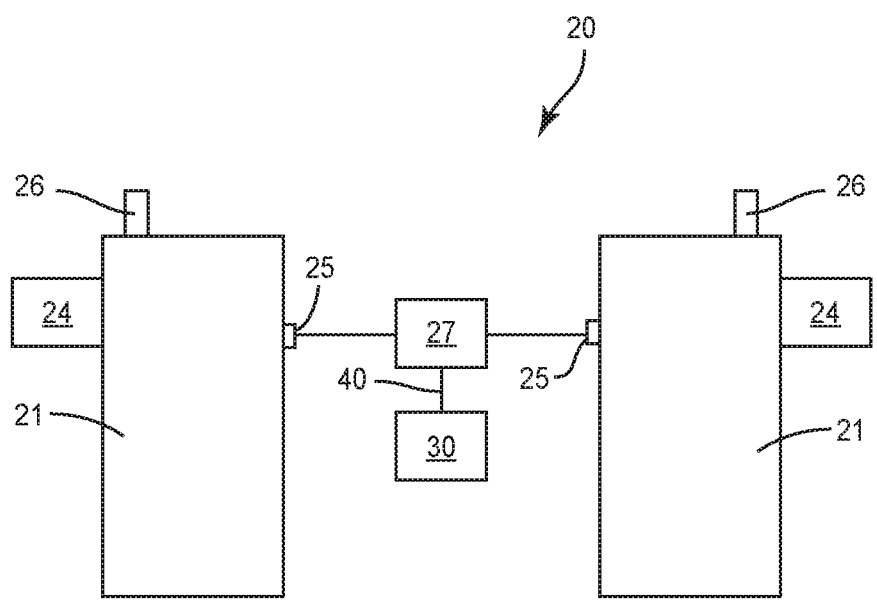
FIG. 4 is a schematic diagram of a pair of tanks.

FIG. 4 includes a design with each of the tanks 21 including an outlet port 25 that delivers fuel to a manifold 27. A conduit can extend from each outlet port 25 to the manifold 27. The fuel from the different tanks 21 is then moved from the manifold 27 to the dispenser 30. In one design, the different tanks 21 include different types of fuel, such as fuels with different octane ratings. The fuels can then be mixed in the manifold 27 as necessary to produce the desired type of fuel that is the sent to the dispenser 30.

One or more pumps 24 move the fuel within the fuel unit 10. This can include moving the fuel between the tanks 21, to the manifold 27, through the conduit 40, and through the dispenser 30 for dispensing to the user. The one or more pumps 24 can move the fuel through the fuel unit 10 at different pressures and rates. One pump 24 is a variable speed pump that can move fuel at various speeds. One design includes movement of the fuel for an output rate through the dispenser 30 of ten (10) gallons per minute.

Figure 5:
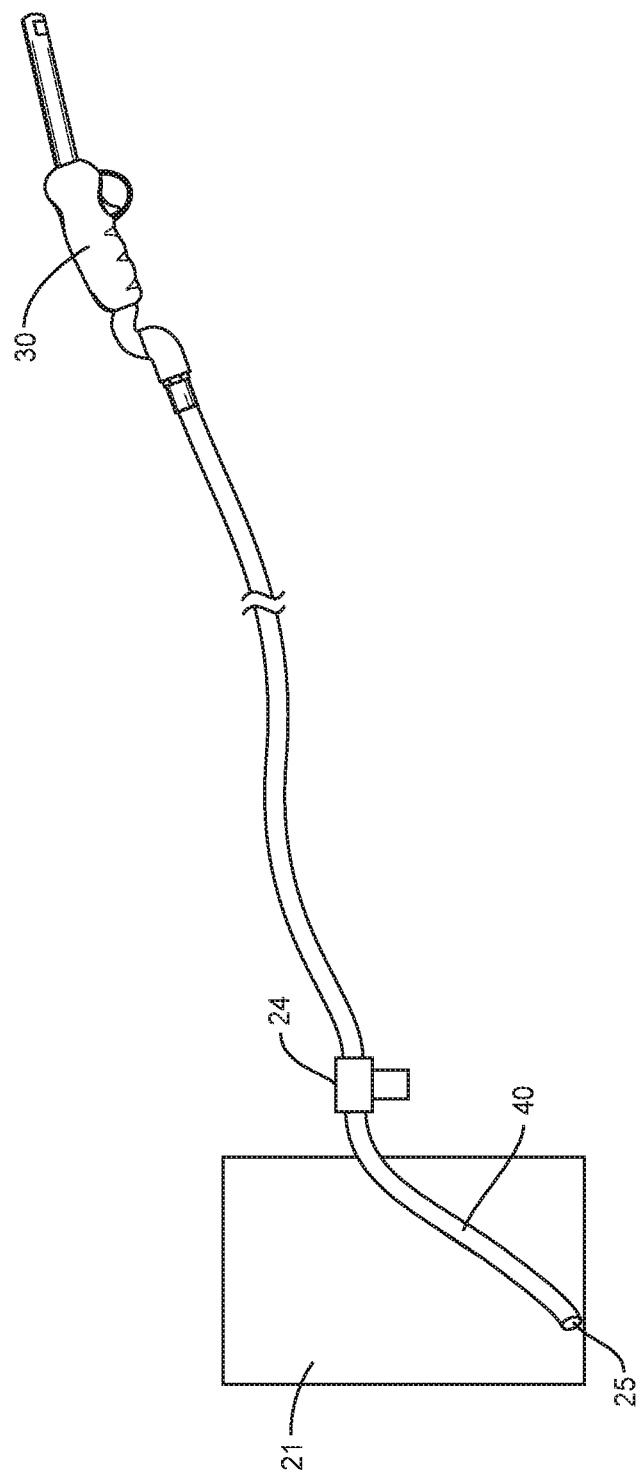
FIG. 5 is a schematic diagram of a conduit extending between a storage tank and a dispenser.

FIG. 5 schematically illustrates a pump 24 positioned along the conduit 40. The pump 24 can move the fuel from the outlet 25 of the tank 21 and along the conduit 40 to the dispenser 30.

The conduit 40 provides an avenue for moving the fuel from the one or more tanks 21 to the dispenser 30. The conduit 40 can be a hose having variable inner diameters and constructions. In one embodiment, the conduit 40 is a hose with a ⅝" inner diameter.

Figure 6:
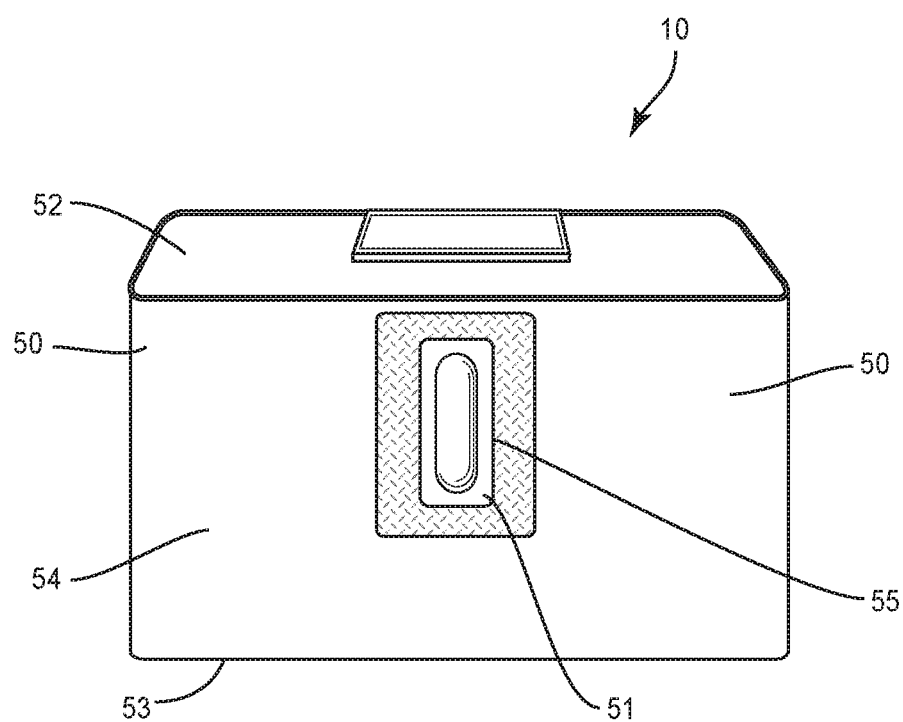
FIG. 6 is a front perspective view of a fuel unit in a closed position.
Figure 7:
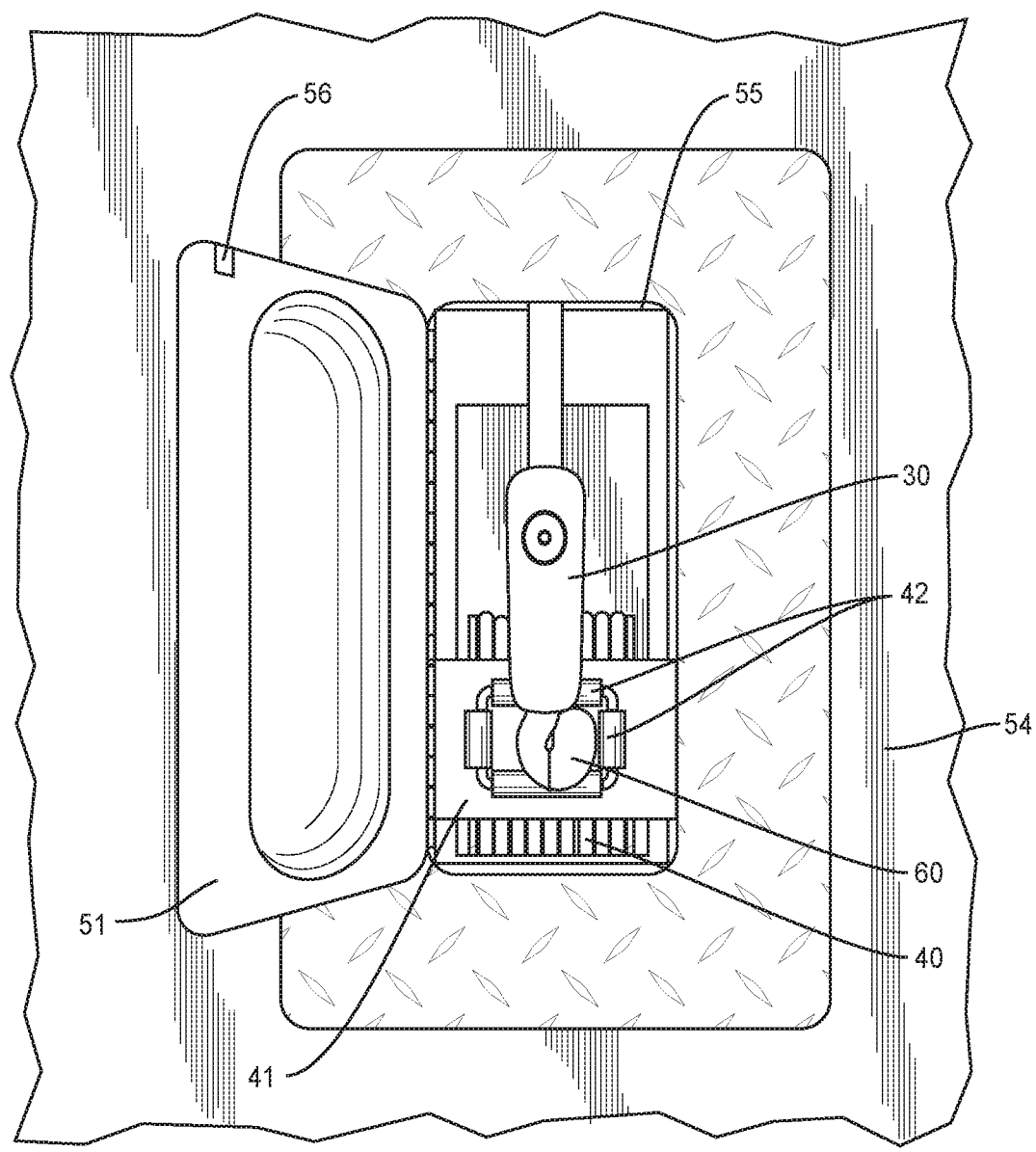
FIG. 7 is a perspective view of a dispenser positioned in an opening in a cabinet in an open position.

The cabinet 50 extends around the tanks 21 as illustrated in FIG. 6. The cabinet 50 includes outer walls that extend around and form an enclosed interior space that contains that tanks 21 and conduit 40 when in a retracted position. The outer walls include a top 52, floor 53, and side walls 54. One or more of the outer walls can be constructed from various materials, including but not limited to metal such as steel and aluminum. The floor 53 can be constructed from rubber to electrically insulate the fuel unit 10. As illustrated in FIG. 7, an opening 55 extends through one of the side walls 54 to accommodate the dispenser 30. The lower section of the cabinet 50 between the floor 53 and the opening 55 is fluid-proof to contain fuel in the event of a leak of one or more of the tanks 21 and/or the conduit 40.

A door 51 is attached to the side wall 54 and is sized to extend across the opening 55. The door 51 is selectively positionable between a closed position as illustrated in FIG. 6 to prevent access to the dispenser 30, and an open position as illustrated in FIG. 7 to access the dispenser 30. The door 51 can include a concave shape to extend over the dispenser 30 when the door 51 is in the closed position. The door 51 can also include a lock 56 to secure the door 51 in the closed position. The door 51 can also provide for fire and heat resistance in the event the fuel unit 10 is in an environment with high heat (e.g., in a building that is on fire).

In one design, the door 51 is a solid member that is attached to the cabinet 50 and movable between the open and closed positions. The door 51 can include hinges and pivot between the positions. Another design, the door 51 is slidable relative to the cabinet 50 between the open and closed positions. In one design, the door 51 includes multiple different sections or slats that are pivotally connected together. The door 51 can be slid and rolled between the positions. The slatted door can be solid. One specific design includes the door 51 constructed from metal.

As illustrated in FIG. 7, a mounting frame 41 can extend across the opening 55 to position the dispenser 30 when not in use. The mounting frame 41 includes an opening through which the conduit 40 can be removed from the interior space. Rollers 42 extend along one or more sides of the opening 55 to facilitate extending and retracting the conduit 40 from the interior space.

Figure 8:
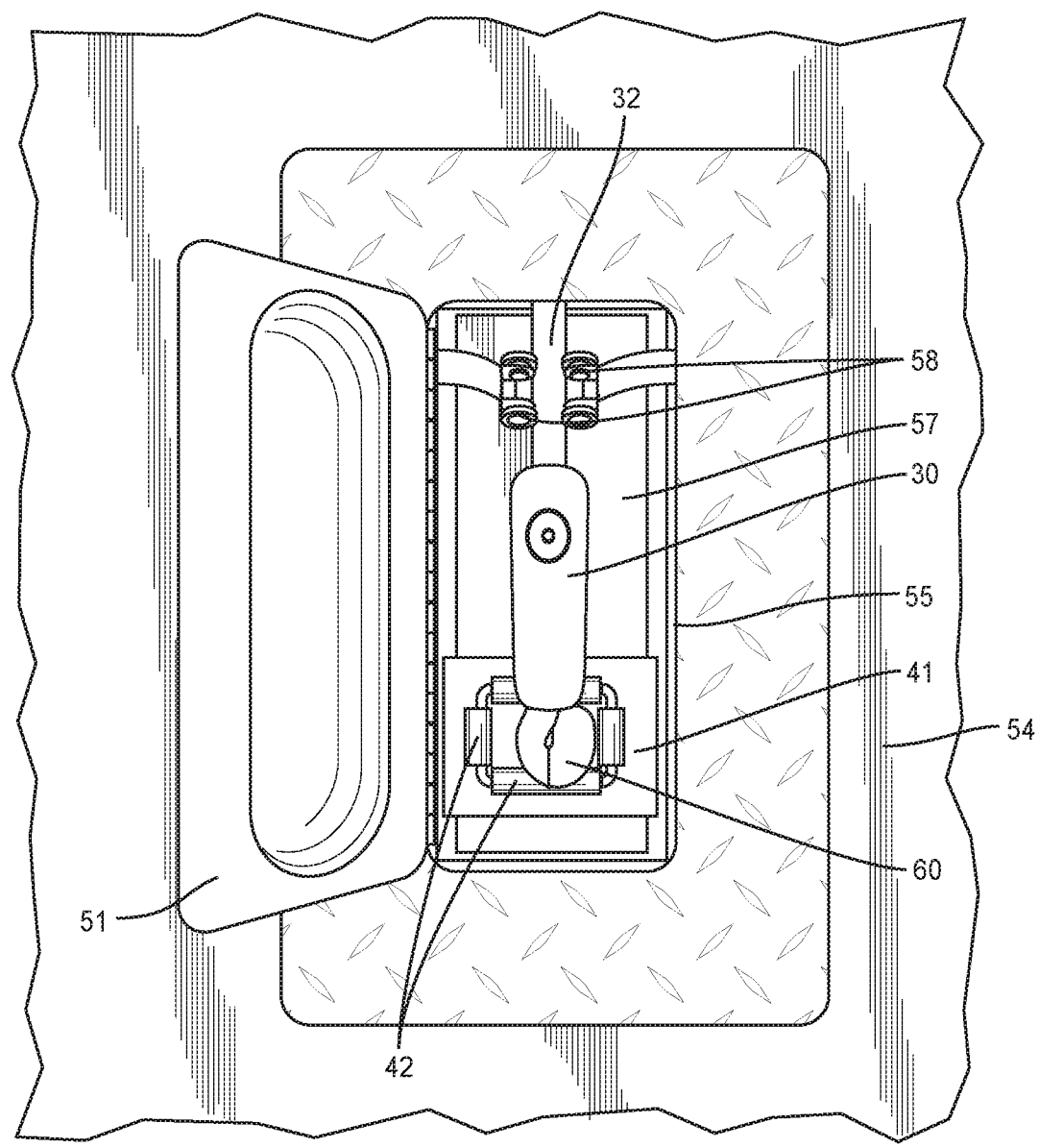
FIG. 8 is a perspective view of a dispenser positioned in an opening in a cabinet in an open position.

A plate 57 can extend across the opening 55 as illustrated in FIG. 8. The plate 55 is recessed inward from the side wall 54 to provide space for positioning the dispenser 30 and allow for the door 51 to move to the closed position. A mount 58 is positioned over the plate 55 to receive a nozzle 32 of the dispenser 30. The mount 58 can include a series of opposing rollers that are spaced apart by a gap to receive the nozzle 32. The mount 58 secures the nozzle 32 and can provide positive tactile feedback to the user when the dispenser 30 is fully mounted in position as the rollers are biased inward and snap onto the nozzle 32.

The cabinet 50 is configured to protect the storage unit 20, dispenser 30, and conduit 40. The cabinet 50 is constructed from sturdy, rigid materials that provide a protective barrier from external forces. Further, the cabinet 50 provides a heat shield in the event of a fire. The cabinet 50 is made of materials that prevent ingress of fire. Further, insulation can be positioned within the interior space to further prevent ingress and provide a temperature barrier. In one embodiment, the interior space includes mineral wool insulation that is made from rock, blast furnace slag, and other materials that are melted and spun into fibers. For additional safety protection, one or more of the tanks 21 can include reticulated foam within the interior to prevent fuel leaks.

Figure 9:
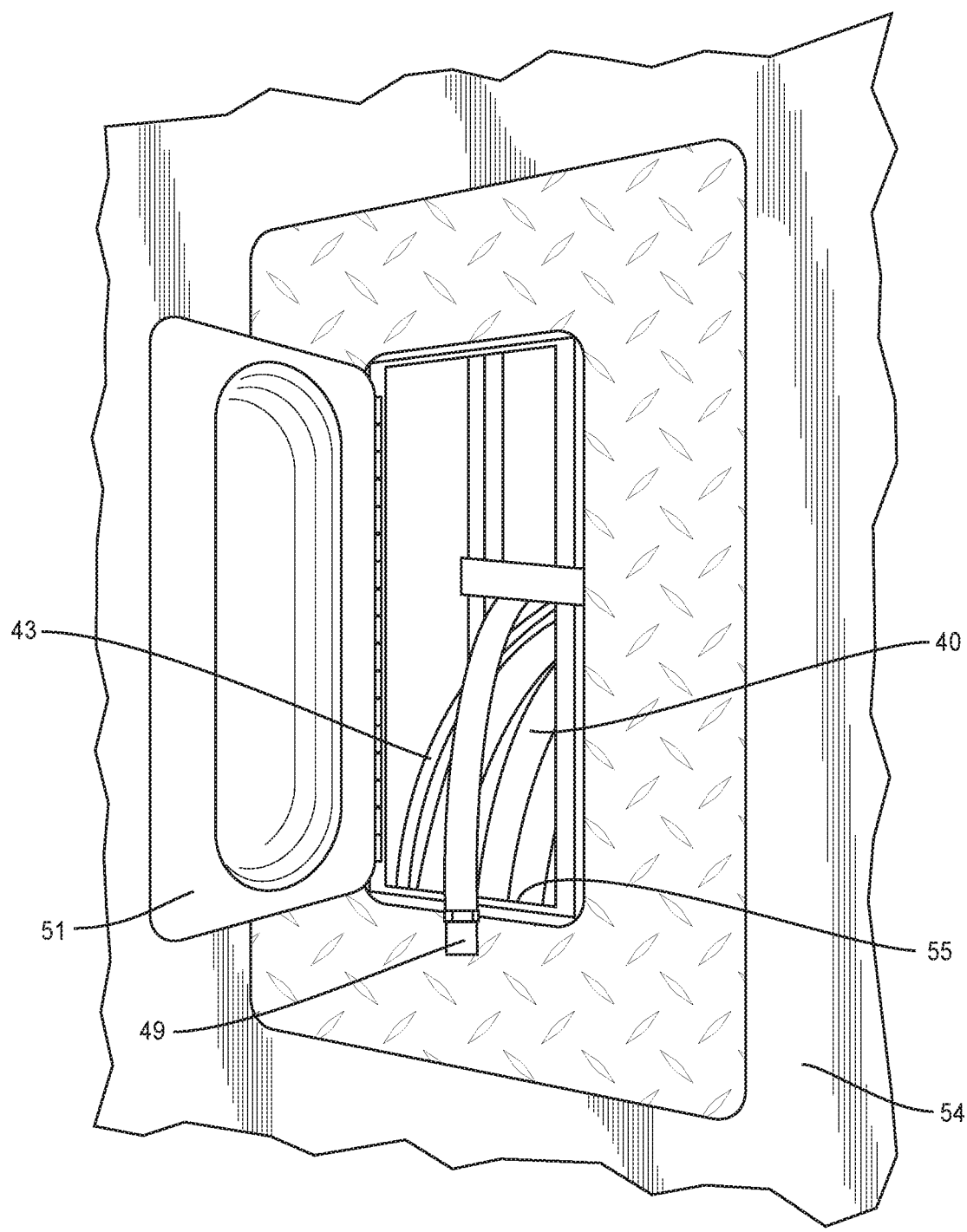
FIG. 9 is a perspective view of a door in an open position with a conduit positioned within an interior space of a cabinet and a distal end of the conduit outward beyond the cabinet.

The conduit 40 is positioned in interior space of the cabinet 50 in proximity to the opening 55. This positioning provides for the conduit 40 to be extended and retracted relative to the cabinet 50 to provide fuel to receptacles within proximity of the fuel unit 10. The conduit 40 can be rolled onto a rotatable holder 43 that is positioned in the interior space as illustrated in FIG. 9 (which illustrates the conduit 40 without the dispenser 30 attached to the end 49). The holder 43 can include a rounded shape to support the conduit 40 when retracted inward. The holder 43 can be spring biased to maintain the conduit 40 rolled onto the holder 43. A user is able to grasp the dispenser 30 and/or conduit 40 and pull it outward from the cabinet 50 to overcome the biasing force and pull the conduit 40 outward as necessary. Once complete, the spring can rotate the holder 43 and roll the conduit back onto the holder 43 and into the interior space of the cabinet 50.

Figure 10:
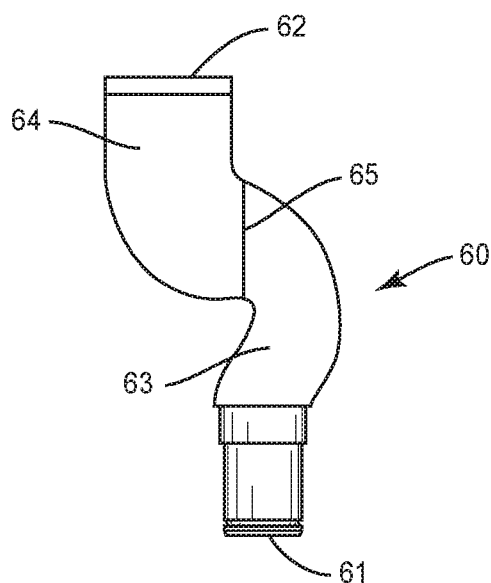
FIG. 10 is a perspective view of a connector.

A hollow connector 60 connects the end of the conduit 49 and the dispenser 30. As illustrated in FIG. 10, the connector 60 includes a first end 61 that attaches to the end 49 of the conduit 40 and a second end 62 that attaches to the dispenser 30. The first end 61 is part of a first section 63 and the second end 62 is part of a second section 64. Each of the sections 63, 64 is constructed of a rigid material, including but not limited to metals and ceramics. The first end 61 is configured to rotate 360° relative to a remainder of the first section 63. The second end 62 is configured to rotate 360° relative to a remainder of the second section 64. The first and second sections 63, 64 are pivotally connected at a joint 65 that allows for pivoting movement. In one embodiment, the first and second sections 63, 64 can pivot relative to each other by 270°. This provides for positioning the dispenser 30 at various angular positions relative to the conduit 40 during dispensing of the fuel.

Figure 12:
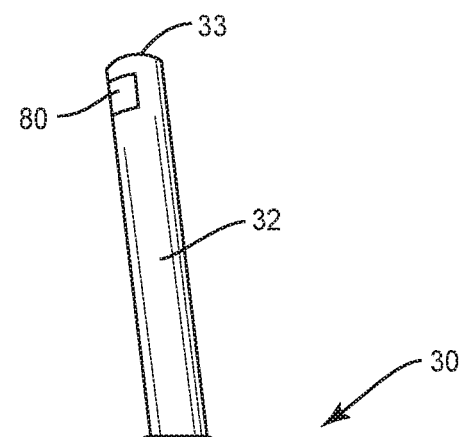
FIG. 12 is a front partial view of a dispenser.
Figure 12:
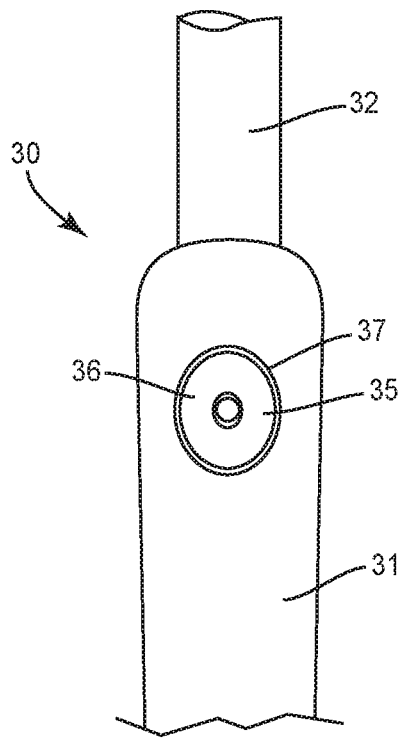
Figure 11:
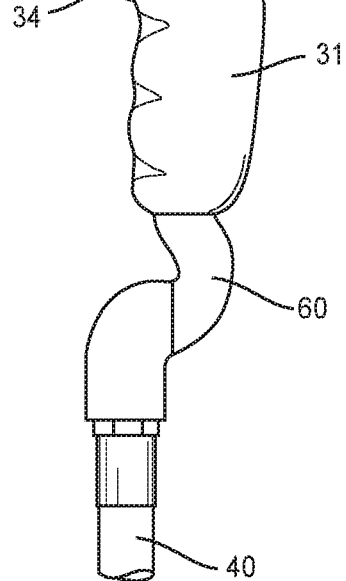
FIG. 11 is a perspective view of a dispenser and a connector connected to a conduit.

The dispenser 30 is positioned at the end of the conduit 40 and configured to dispense the fuel. As illustrated in FIGS. 11 and 12, the dispenser 30 includes a handle 31 and a nozzle 32. The nozzle 32 includes a tip 33 sized to be inserted into a fuel receptacle (e.g., vehicle gas tank, gas can) that is receiving the fuel. The handle 31 is sized to be grasped and held within the user's hand. A trigger 34 extends outward from one side of the handle 31 for a user to move with their finger when the dispenser 30 is grasped in their hand.

The dispenser 30 is configured with one or more safety features to dispense fuel. One safety feature is a sensor 35 on the handle 31 to detect the user. A second safety feature is a sensor 80 on the nozzle 32 to detect a metallic fuel receptacle.

The sensor 35 is positioned on the dispenser handle 31 to detect that the user has grasped the dispenser 30. As illustrated in FIG. 12, the sensor 35 can include a contact pad 36 on the top of the handle 31 that is sized for the user to place their thumb. The sensor 35 can be an inductance sensor that detects that the user's thumb is on the contact pad 36. In situations in which the user's thumb would not directly contact the contact pad 36 (e.g., the user is wearing gloves), the sensor 35 can also be a contact switch that is energized when the user places a predetermined amount of force on the contact pad 36. A display 37 can illuminate on the dispenser 30 when the sensor 35 has been triggered. The display 37 can include a lighted ribbon that extends around the contact pad 36. The display 37 indicates to the user that the dispenser 30 is operational once it is inserted into the fuel receptacle.

The sensor 80 is positioned to detect when the dispenser 30 is in proximity to a metallic fuel receptacle. As illustrated in FIG. 11, the sensor 80 can be located along the nozzle 32 which is inserted into the metallic fuel receptacle. The sensor 80 can be an inductive proximity sensor 80. The sensor 80 can include a coil and oscillator that creates a magnetic field at a surface of the nozzle 32. When the nozzle 32 is positioned in proximity to metal (e.g., the nozzle 32 is inserted into a fuel tank of a vehicle), a change in the magnetic field is sensed by sensing circuitry.

Figure 13:
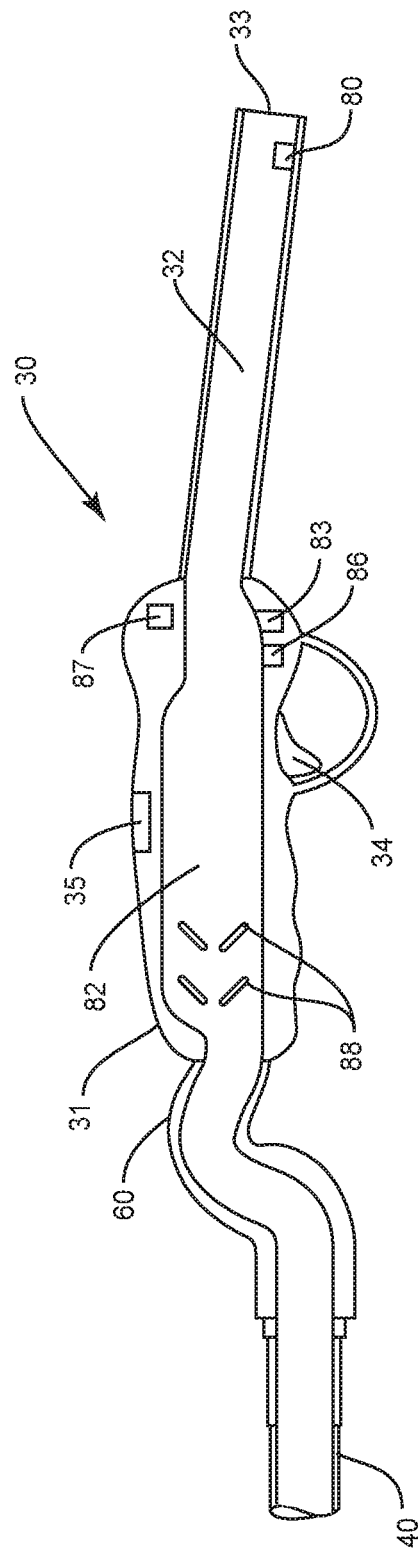
FIG. 13 is a schematic diagram of a dispenser.

FIG. 13 schematically illustrates the dispenser 30 that includes the sensor 80 that detects a metal object in proximity to the nozzle 32, and sensor 35 that detects the user. The dispenser 30 also includes a fuel line 82 that extends through the handle 31. The fuel line 82 extends between the conduit 40 and the nozzle 32. An enlarged section of the fuel line 82 can include baffles 88 to slow the velocity of the fuel entering the fuel line 82. Further reductions in the velocity can occur through the fuel moving through the connector 60. In one design, the section of the connector 60 at the conduit 40 includes a larger inner diameter than the second section connected to the dispenser 30.

A valve 83 is positioned along the fuel line 82 to control the amount of fuel that moves along the fuel line 82. The valve 83 includes a solenoid and a plunger. In a closed position, the plunger extends across the fuel line 82 and prevents fuel from passing. In an open position, the plunger is moved away from the fuel line 82 to allow fuel to pass. The open position can include the plunger completely or partially open to control the amount of fuel that moves through the line and is dispensed through the nozzle 32. A pressure sensor 86 is also positioned along the fuel line 82 to sense a pressure of the fuel. The pressure sensor 86 can be positioned between the conduit 40 and the valve 83. A power source 87 can be positioned in the dispenser 30 to provide power to one or more of the components, including but not limited to the display 37, sensor 35, sensor 80, and valve 83.

Figure 14:
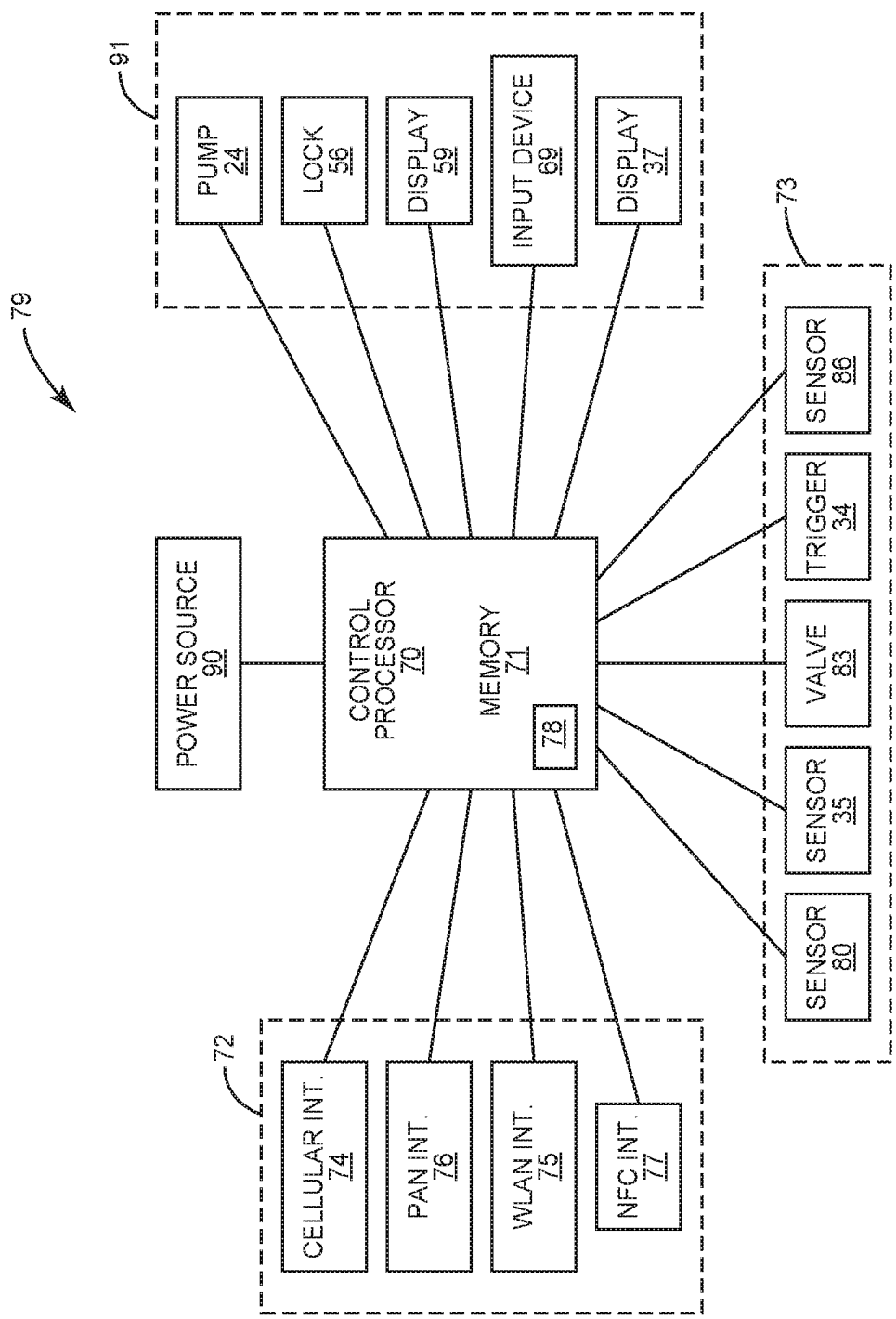
FIG. 14 is a schematic diagram of a control unit.

The fuel unit 10 includes a control unit 79 that oversees the fuel dispensing operation. The control unit 79 can be positioned in the cabinet 50. Alternatively the control unit 79 can be positioned in the dispenser 30. FIG. 14 illustrates a control unit 79 that includes a main control processor 70, memory circuit 71, a communication circuit 72, and user interface 73. The main control processor 70 controls overall operation of the dispenser 30 according to program instructions stored in memory circuit 71. The main control processor 70 can comprise one or more circuits, microcontrollers, microprocessors, hardware, or a combination thereof. Memory circuit 71 includes a non-transitory computer readable storage medium storing program instructions, such as a computer program product, that configures the control processor 70 to implement one or more of the techniques discussed herein. Memory circuit 71 can include various memory devices such as, for example, read-only memory, and flash memory. Memory circuit 71 can be incorporated with the control processor 70 as illustrated in FIG. 14, or the two can be separate. Alternatively, the control unit 79 may omit the memory circuit 71, e.g., according to at least some embodiments in which the control processor 70 is dedicated and non-programmable.

The communications circuit 72 enables communication between the control processor 70 and one or more other entities, such as the user devices 100 and/or one or more remote sources over communication networks. In the exemplary embodiment, the communications circuit 72 includes two separate interfaces referred to herein as the cellular interface 74 and WLAN interface 75. The cellular interface 74 enables communication with a mobile communication network (e.g., a WCDMA, LTE, or WiMAX network). The WLAN interface 75 is configured to communicate with a local area network, e.g., via a wireless access point. An exemplary WLAN interface could operate according to the 802.11 family of standards, which is commonly known as a WiFi interface. The communication circuit 72 can further include a personal area network (PAN) interface 76, such as a Bluetooth interface.

The communication circuit 72 can also include a Near Field Communication (NFC) interface 77. Near Field Communication is a short-range wireless connectivity technology that uses magnetic field induction to permit devices to share information with each other over short distances (e.g., on the order of 4 centimeters or less). Communication between two NFC-capable devices is possible when the devices are within close physical proximity to one another, and may be initiated when the devices are actually brought into contact with each other. The distance separating two NFC-capable devices is typically anywhere between about 0 and 4 centimeters, but in some instances can be up to about 20 centimeters. In the embodiment of FIG. 14, NFC interface 77 includes an "active" transceiver circuit capable of communicating information and data with an external NFC-capable device. NFC interface 77 can include its own power supply, or may draw power from a battery associated with the fuel unit 10. Once the user device 100 is within close physical proximity to the fuel unit 10, an NFC link can be established to facilitate a unidirectional and/or bi-directional data exchange between the two devices as appropriate with respect to particular embodiments.

The fuel unit 10 is configured to receive a signal from a user device 100 to begin the dispensing process. The user device 100 can include a variety of different devices, including but not limited to cellular telephones including "Smartphones," access control fobs, tablet computing devices (e.g., the iPAD, NOOK, KINDLE, etc.), laptop computing devices, ultra-mobile PCs, wearable computing devices, game consoles, Personal Digital Assistants (PDAs) and/or any other device equipped with wireless communication capabilities. The fuel unit 10 is configured to communicate with or otherwise receive a signal from the user device 100 to authenticate the user.

Each of the control unit 79 and user device 100 can include a utility 78 that facilitates the signaling. In the various embodiments, the utility 78 in the control unit 79 is a computer program stored in the memory circuit 71 that is activated to advertise to nearby user devices about the connectivity to the fuel unit 10. In one embodiment, the user activates the utility 78 using the input devices on their device 100 (e.g., touchscreen input on a cell phone). In other embodiments, the utility 78 may already be activated on the user device 100 (e.g., running as a service in the background). Once activated, a message can be included on a display of the user device 100 directing the user to move into proximity of the fuel unit 10. The fuel unit 10 then transmits authentication initiation through one or more of the interfaces of the communication circuit 72.

In various embodiments, authorization information is sent through NFC. The use of NFC is relatively secure since it works with the fuel unit 10 and user device 100 being in a very short range of one another. Because of the required proximity, the chance for intercepting the authorization information that is being transmitted is relatively small. The authorization information being transferred can include but is not limited to the user name, account number, or other identifying information.

The memory circuit 71 associated with the control processor 70 is operative to store a software application (e.g., the utility 78) that provides for the fuel unit 10 to receive the authentication information. The software application can have a variety of different formats, such as a dedicated application, or as a cached application downloaded through a web browser. The user device 100 also includes a similar program (e.g., the utility 78).

In one or more embodiments, the authentication process is performed automatically by the fuel unit 10. The user is not required to provide any additional inputs to provide for dispensing fuel. This provides for the user to dispense the fuel in a straight-forward manner that is not cumbersome or complicated for the user, and does not require the user to know their authentication information.

The fuel unit 10 and user device 100 can transmit authorization information using one or more of a variety of wireless communication protocols for communicating with in-range mobile communication devices. Examples include, but are not limited to, Ultra-WideBand (UWB), Institute of Electrical and Electronics Engineers (IEEE) 802.11 Wireless Fidelity (WiFi), IEEE 802.16 Worldwide Interoperability for Microwave Access (WiMax), Wireless Broadband (WiBro), Infrared (IrDA), Radio Frequency Identification (RFID), Near Field Communication (NFC), HiperLAN, HiperMAN, IEEE 802.20, IEEE 802.15.4 (ZigBee), or the like.

The dispenser interface 73 provides for the control unit 79 to control the operation of the dispenser 30. This can include sending and/or receiving signals with sensors 35, 80, 86, the solenoid valve 83, and the trigger 34.

A storage unit interface 91 provides for control over various components on the storage unit 20 and/or cabinet 50. This can include the one or more pumps 24 that move the fuel, and the lock 56 to access the opening 55 in the cabinet 50 and the dispenser 30. The cabinet 50 can also include a display 59 to display messages to the user. One or more input devices 69 (e.g., keypad, touchpad) can be positioned on the cabinet 50 for the user to input various information.

A power source 90 can provide power to the control unit 79. The power source 90 can include various configurations, including but not limited to batteries. The control unit 79 can additionally or alternatively provide a hardwire connection to an external power source (e.g., electrical power from the building in which the fuel unit 10 is housed).

Authentication information about the user may be maintained at the user device 10, the control unit 79, or both. In one particular embodiment, the authentication information is maintained at the memory circuit 71 and accessed as necessary during the authentication process that begins the fuel dispensing process. Usage information regarding the amount of fuel dispensed can also be maintained and stored. The usage information can then be accessed as necessary for various billing requirements.

Figure 15:
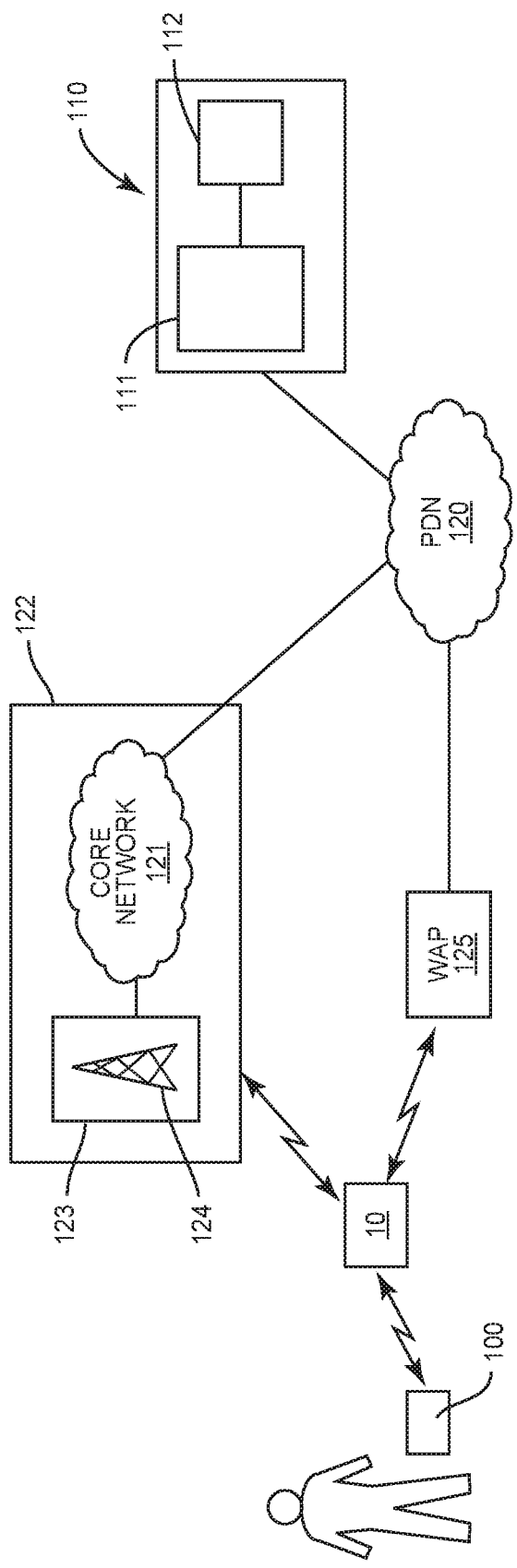
FIG. 15 is a schematic diagram of a wireless communication network.

The user information can be maintained remotely at a server 110. This can be in addition to or in place of local storage at the fuel unit 10. FIG. 15 illustrates a wireless communication network in which the fuel unit 10 can access the information at the server 110 over a packet data network (PDN) 120. The PDN 120 can comprise a public network such as the Internet, a private network, or both. The mobile communication network (MCN) 122 includes a core network 121 and a radio access network (RAN) 123 including one or more base stations 124. The MCN 122 can be a conventional cellular network operating according to any communication standards now known or later developed. For example, the MCN 122 can include a Wideband Code Division Multiple Access (WCDMA) network, a Long Term Evolution (LTE) network, or WiMAX network. The MCN 122 is further configured to access the PDN 120. The fuel unit 10 can also be able to communicate with a wireless access point 125 to access the PDN 55. The fuel unit 10 can also be connected to a nearby device (not shown) through a wired interface, such as a RS 232, USB or FIREWARE interface. Such a device would be configured to access the PDN 120.

The fuel unit 10 is configured to communicate through the PDN 120 to the server 110. The monitoring server 110 can be configured to provide a web interface 111. A database 112 can also be associated to store the user information. The server 110 includes one or more processing circuits that can include one or more microprocessors, microcontrollers, Application Specific Integrated Circuits (ASICs), or the like, configured with appropriate software and/or firmware. A computer readable storage medium stores data and computer readable program code that configures the processing circuit to implement the techniques described above. Memory circuit is a non-transitory computer readable medium, and may include various memory devices such as random access memory, read-only memory, and flash memory. A communication interface connects the server 110 to the PDN 120, and may be configured to communicate with the PDN 120 according to one or more 802.11 standards. The communication interface may support a wired connection (e.g., Ethernet), a wireless connection, or both. The database 112 is stored in a non-transitory computer readable storage medium (e.g., an electronic, magnetic, optical, electromagnetic, or semiconductor system-based storage device). The database 112 may be local or remote relative to the monitoring server 110. A clock may be associated with the processing circuit that measures the various timing requirements for specific events. The clock may be incorporated with the processing circuit, or may be a separate component independent from the processing circuit. The clock may be configured to measure the specific time during each day, as well as to measure the various time periods (i.e., days, weeks, months, years, etc.).

The user may be required to maintain an active account that includes their identification information, billing information, authentication information, and any special instructions regarding use of the fuel unit 10. The server 110 can provide a web interface 111 for the user to initially open an account, and then also to monitor and control their account. The web interface 111 can support a website through which the contents of the database 112 are accessible. In one or more embodiments the web interface 111 provides browser-based access to the contents of the database 112. The user can login to the browser-based interface and access the pertinent usage information. Alternatively, the user can obtain information (e.g., usage information, billing information) from the database 112 using one or more Application Programming Interfaces (APIs) through a desktop or mobile client, for example. Also, in one or more embodiments the web interface supports access to the database 112 using web services in addition to, or as an alternative to, the browser-based interface described above.

Figure 16:
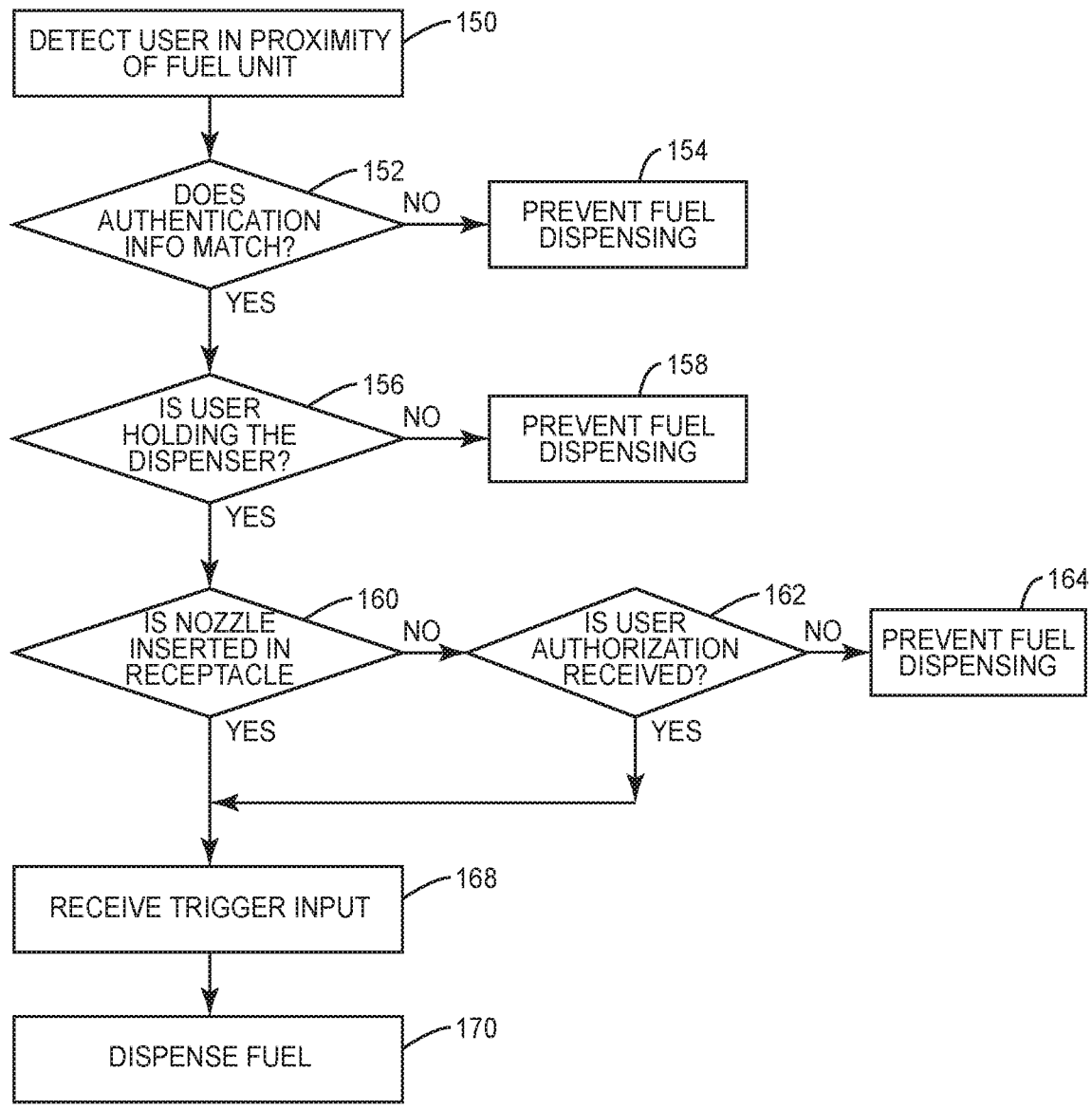
FIG. 16 is a flowchart diagram of a method of dispensing fuel.

Once a user account has been established, the user is able to access the fuel unit 10 and dispense fuel. FIG. 16 illustrates one method of dispensing fuel from the fuel unit 10. The fuel unit 10 initially detects that the user is in proximity (block 150). This can include the fuel unit 10 receiving the authentication information from the user in the various manners described above. In one specific embodiment, the user is in possession of the user device 100 that communicates via Bluetooth with the control unit 79.

The fuel unit 10 receives the authentication information and determines whether the user is authorized to dispense fuel (block 152). This can include comparing the received authentication information with data stored in the memory circuit 71. This can also include sending the information to the remote server 110 that determines whether the user has an active account. If the user is not authorized, the fuel unit 10 prevents fuel from being dispensed (block 154). This can include maintaining the door 51 in a locked position to prevent access to the dispenser 30. This can also include displaying a message on the display 59 indicating that the user is not authorized to dispense fuel.

When the user is authorized, the fuel door 51 is unlocked and the door 51 can be spring biased to open to provide access to the dispenser 30 (see FIG. 8). A light on the cabinet 50 can illuminate the dispenser 30 to clearly indicate to the user that they are to grasp the dispenser 30.

The control unit 79 then determines that the user is holding the dispenser 30 (block 156). This includes detecting the user's thumb on the contact pad 36 through the sensor 35. The sensor 35 can detect the user's thumb and/or pressure being applied by the user to the contact pad 36. Detection of the user through the sensor 35 prevents fuel from being dispensed when the dispenser 30 is not being held by the user. If the user is not holding the dispenser 30, the control unit 79 prevents fuel dispensing (block 158). This can include the pump 24 being off. This can also include displaying a message on the display 59 indicating the status. If the user is holding the dispenser 30 and their thumb is detected by sensor 35, the ribbon display 37 that extends around the contact pad 56 can be illuminated.

The control unit 79 next determines whether the nozzle 32 of the dispenser 30 is inserted into a metallic fuel receptacle (block 160). This includes the sensor 80 detecting the presence of a metal object. This could occur when the nozzle 32 is inserted into a gas tank of a vehicle or an inlet of a gas can. If the sensor 80 does not detect a metallic fuel receptacle, the user can authorize the fuel dispensing (block 162). This can occur when the user is attempting to dispense fuel into an object that is not detected by the sensor 80, such as a plastic fuel can. The user can enter an input through the input device 69 confirming the dispensing of fuel. The user can also enter an input through the user device 100 that is operating the utility 78 that is running on their device 100 and which signals the fuel unit 10.

If the sensor 80 does not detect a metallic fuel receptacle and there is no user over-ride, the control unit 79 prevents the dispensing of fuel (block 164). If the sensor 80 detects a metallic fuel receptacle or receives an over-ride, the control unit 79 then receives an input from the trigger 34 on the dispenser 30 indicating that fuel is to be dispensed (block 168). The control unit 79 activates the solenoid valve 83 to open the fuel line 83 and allow fuel to flow.

The pump 24 provides for moving the fuel through the conduit 40 and dispenser 30. The pump 24 can move the fuel at variable speeds. In one embodiment, the pump 24 is a variable speed 12 volt brushless pump that can dispense fuel at various rates up to ten (10) gallon per minute.

Figure 17:
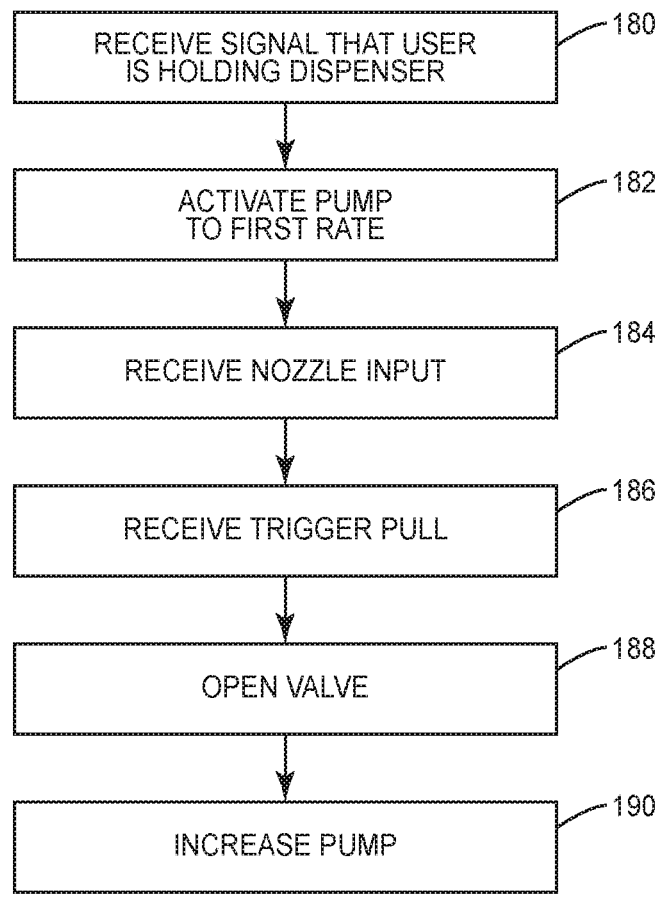
FIG. 17 is a flowchart diagram of a method of dispensing fuel.

The pump 24 can be operated to maintain a positive pressure in the conduit 40 for dispensing the fuel. FIG. 17 illustrates one method of dispensing the fuel. The control unit 79 receives a signal from sensor 35 that the user is grasping the dispenser 70 and their thumb is on the contact pad 36 (block 180). Upon receiving the signal, the pump 24 can be activated and operated at a first rate (block 182). This moves fuel into the conduit 40 to the dispenser 30. Because the valve 83 is closed, the fuel in the line upstream from the valve 83 obtains a pressure that is sensed by the pressure sensor 86. The pump 24 can be adjusted as necessary to obtain the desired pressure.

The control unit 79 then receives from sensor 80 that the nozzle 32 has been inserted into a fuel receptacle (block 184) and that the trigger 34 has been pulled by the user (block 186). Prior to receipt of both of these signals, the valve 83 is in the closed position to prevent fuel from being dispensed. After receiving these signals (in combination with the signal from sensor 35), the valve 83 is opened (block 188). This allows fuel to flow through the fuel line 82 and nozzle 32 of the dispenser 30 and into the fuel receptacle. The control unit 79 can adjust the rate of the pump 24 based on the position of the trigger 34 that is being pulled by the user. In one embodiment with the trigger 34 being fully pulled, the pump 24 can be operated to dispense fuel at a rate of 10 gallons per minute.

The valve 83 can be biased towards the closed position. This prevents the flow of fuel until actively open by the control unit 79. This further prevents the flow of fuel in the event of a power failure.

In one design in which the nozzle 32 is to be inserted into a fuel receptacle that is not sensed by the sensor 80, the fuel receptacle can be equipped with a device to provide for detection. This can include but is not limited to an RFID tag that is attached to the fuel receptacle and is able to be detected by a sensor 80 on the nozzle 32.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A fuel unit comprising:
a cabinet comprising:
a wall that extends around and forms an enclosed interior space;
an opening in the wall to provide access to the interior space;
a receptacle positioned at the opening;
a door mounted to the wall at the opening and movable between a closed position that extends across the receptacle and an open position away from the receptacle;
a lock movable between a locked position to secure the door in the closed position and prevent access to the interior space and an unlocked position;
one or more fuel tanks positioned within the interior space with each of the one or more fuel tanks configured to contain fuel;
a conduit connected to the one or more fuel tanks and having a distal end, the conduit being movable through the opening between a retracted position with the distal end positioned in the receptacle and an extended position with the distal end positioned outward beyond the receptacle;
a dispenser mounted to the distal end of the conduit, the dispenser comprising a handle sized to be grasped by a user and a nozzle that extends from the handle and includes an end through which the fuel is dispensed, the dispenser is mounted in the receptacle when the door is in the closed position;
a pump to move the fuel from the one or more fuel tanks through the conduit and the dispenser; and
a control unit positioned within the interior space to control the dispensing of fuel from the one or more fuel tanks, the control unit configured to:
move the lock between the locked and unlocked positions;
activate the pump to move the fuel from the one or more fuel tanks and through the conduit and dispenser.

2. The fuel unit of claim 1, further comprising a first sensor positioned in the handle of the dispenser to detect that the handle is being held by the user and a second sensor positioned in the nozzle of the dispenser to detect that the nozzle is inserted into a fuel receptacle.

3. The fuel unit of claim 1, wherein the receptacle comprises:
a plate that extends across the opening in the wall of the cabinet; and
a mount positioned on an outer side of the plate that secures the dispenser in the receptacle.

4. The fuel unit of claim 1, further comprising a rotatable holder having a rounded shape to support the conduit in the retracted position, the rotatable holder being spring biased towards the retracted position, the rotatable holder positioned within the interior space.

5. The fuel unit of claim 1, wherein the pump is a variable speed pump to dispense the fuel from the one or more fuel tanks and through the conduit and dispenser at various speeds.

6. The fuel unit of claim 1, wherein the door extends completely across the opening in the closed position to prevent access to the conduit, and the dispenser.

7. The fuel unit of claim 1, further comprising a spring that is connected to the door, the spring configured to apply a force to the door to move the door to the open position when the lock moves from the locked position to the unlocked position.

8. The fuel unit of claim 1, further comprising a light that illuminates the dispenser when the door is in the open position.

9. The fuel unit of claim 1, wherein the pump is positioned within the interior space.

10. The fuel unit of claim 1, wherein the control unit comprises:
a communication circuit that receives a signal from the user;
a control processor that determines, based on the signal, that the user is authorized to dispense the fuel and moves the lock from the locked position to the unlocked position.

11. The fuel unit of claim 10, wherein the dispenser comprises a sensor in the handle and the control processor prevents the pump from being activated prior to receiving a signal from the sensor indicating that the user is holding the dispenser.

12. A fuel unit comprising:
a cabinet comprising:
a wall that extends around and forms an enclosed interior space;
an opening that extends through the wall and into the interior space;
a door mounted to the wall at the opening;
a lock positionable between a locked position to secure the door across the opening and an unlocked position;
one or more fuel tanks positioned within the interior space and configured to contain fuel;
a conduit connected to the one or more fuel tanks, the conduit comprising a distal end opposite the one or more fuel tanks;
a dispenser mounted to the distal end of the conduit;
a pump to move the fuel from the one or more fuel tanks through the conduit and the dispenser;
a control unit positioned within the interior space to control dispensing of fuel from the one or more fuel tanks, the control unit configured to:
receive a request for the fuel from a user;
determine that the user is authorized to dispense the fuel;
move the lock to the unlocked position to provide access to the dispenser that is positioned in the interior space;
receive first and second signals that the dispenser is ready to dispense the fuel; and
activate the pump and dispense the fuel through the dispenser after receiving the first and second signals;
of the dispenser, the one or more fuel tanks, the pump, the control unit, and the conduit, just the dispenser is positioned outside of the interior space when the door is positioned across the opening and the lock is in the locked position with the one or more fuel tanks, the pump, the control unit and the conduit positioned within the interior space.

13. The fuel unit of claim 12, wherein the conduit and the dispenser are positioned behind the door when the door is in a closed position and the lock is in the locked position.

14. The fuel unit of claim 13, further comprising:
a plate that extends across the opening in the wall of the cabinet; and a mount positioned in front of the plate to secure the dispenser to the plate when the door is in a closed position and the lock is in the locked position.

15. The fuel unit of claim 12, further comprising a first sensor positioned in the dispenser to detect that the handle is being held by the user and to send the first signal and a second sensor to detect that the nozzle is inserted into a fuel receptacle and to send the second signal.

16. A fuel unit comprising:
a cabinet comprising:
- a wall that extends around and forms an enclosed interior space;
- an opening in the wall to provide access to the interior space;
- a plate that extends partially across the opening and is recessed inward from the wall to form a receptacle;
- a door mounted to the wall at the opening;

one or more fuel tanks positioned within the interior space with each of the one or more fuel tanks configured to contain fuel;

a conduit that extends from the one or more fuel tanks and is movable through the opening;

a dispenser mounted to the conduit and with an end through which the fuel is dispensed, the dispenser configured to be mounted in the receptacle when the door is in the closed position;

a pump to move the fuel from the one or more fuel tanks through the conduit and the dispenser; and a control unit positioned within the interior space to control the dispensing of fuel from the one or more fuel tanks;

wherein the door is movable between a closed position that extends across the receptacle and the dispenser to prevent access to the dispenser when the dispenser is mounted in the receptacle and an open position away from the receptacle to provide access to the dispenser.

\* \* \* \* \*